Figure 1:
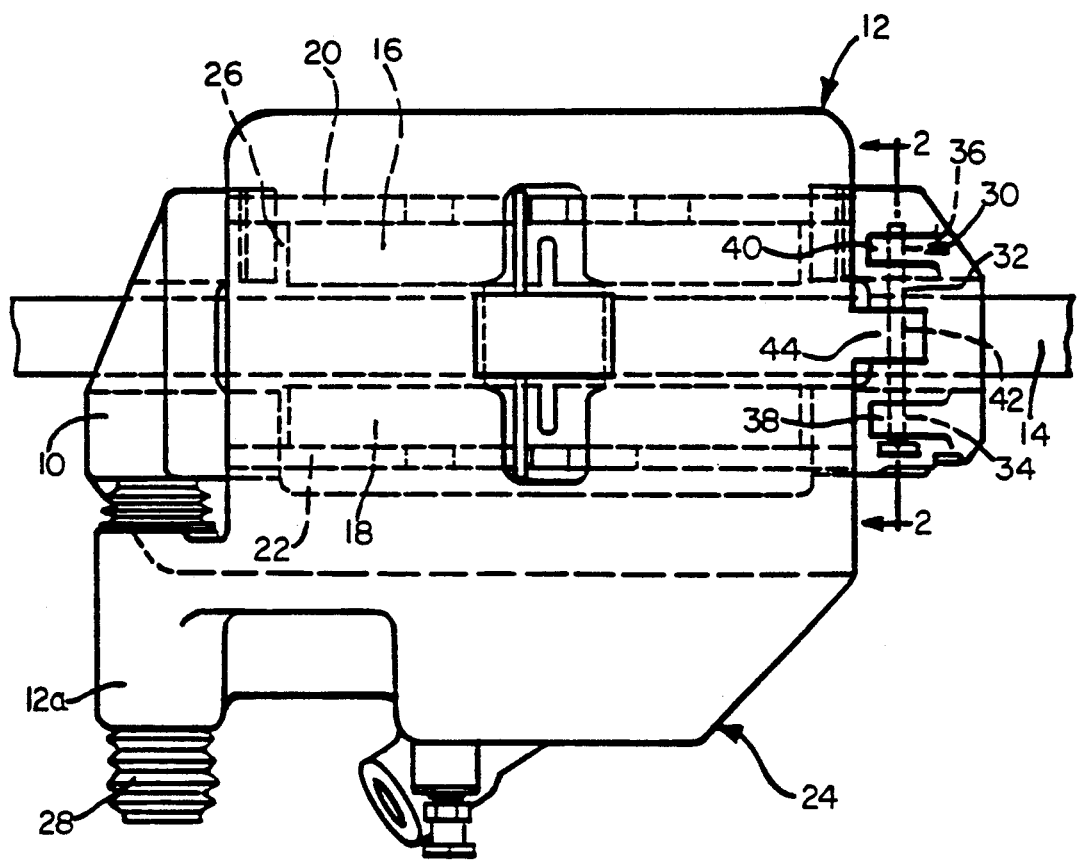

United States Patent [19]

Imponente et al.

[11] Patent Number: 5,263,555
[45] Date of Patent: Nov. 23, 1993

[54] DISK-BRAKE

[75] Inventors: Michele Imponente; Giovanni Lacalamita, both of Bari, Italy

[73] Assignee: Bendiz Altecna S.p.A., Modugno, Italy

[21] Appl. No.: 963,228

[22] Filed: Oct. 19, 1992

[30] Foreign Application Priority Data

Oct. 25, 1991 [IT] Italy .................. 91A00804

[51] Int. Cl.⁵ .............. F16D 65/07; F16D 65/14; F16D 65/16
[52] U.S. Cl. ................... 188/73.34; 188/73.44; 188/73.39
[58] Field of Search ............. 188/73.34, 73.33, 73.32, 188/73.31, 73.39, 73.44, 73.45, 73.35, 73.36, 73.37

[56] References Cited

U.S. PATENT DOCUMENTS

| | | | |
|---|---|---|---|
| 4,109,766 | 8/1978 | Inoue et al. | 188/73.34 |
| 4,279,331 | 7/1981 | Lüpertz | 188/73.45 |
| 4,308,938 | 1/1982 | Denton | 188/73.45 |
| 4,351,421 | 9/1982 | Kurata et al. | 188/73.45 |
| 4,369,862 | 1/1983 | Seki | 188/73.32 X |
| 4,446,947 | 5/1984 | Le Deit | 188/73.34 |
| 4,446,948 | 5/1984 | Melinat | 188/73.34 X |
| 4,467,898 | 8/1984 | Courbot et al. | 188/73.34 X |
| 4,527,667 | 7/1985 | Courbot | 188/73.44 X |
| 4,527,670 | 7/1985 | Courbot | 188/73.34 X |
| 4,533,023 | 8/1985 | Carre et al. | 188/73.46 X |
| 4,567,968 | 2/1986 | Denree | 188/73.45 X |

FOREIGN PATENT DOCUMENTS

| | | | |
|---|---|---|---|
| 2430659 | 1/1976 | Fed. Rep. of Germany | 188/73.44 |
| 2649843 | 5/1977 | Fed. Rep. of Germany | 188/73.34 |
| 3103383 | 8/1982 | Fed. Rep. of Germany | 188/73.44 |

*Primary Examiner*—Douglas C. Butler
*Attorney, Agent, or Firm*—Larry J. Palguta; Ken C. Decker

[57] ABSTRACT

The invention relates to a disk-brake having a caliper (12) mounted slidably on a stationary support (10), comprising two friction elements (16, 18) received in an anchored and sliding member in the stationary support (10) and capable of coming into frictional engagement with the opposite faces of a rotating disk (14) during the actuation of a brake motor (14), an axial column (28) fixed to the stationary support (10) and received in a sliding manner in a corresponding bore formed in a caliper (12), and a mechanism (32) for locking the caliper (12) to the stationary support (10) in terms of rotation about the column (28). According to the invention, the mechanism (32) for locking the caliper (12) to the stationary support (10) comprises a self-locking mechanism (58, 78, 88).

5 Claims, 3 Drawing Sheets

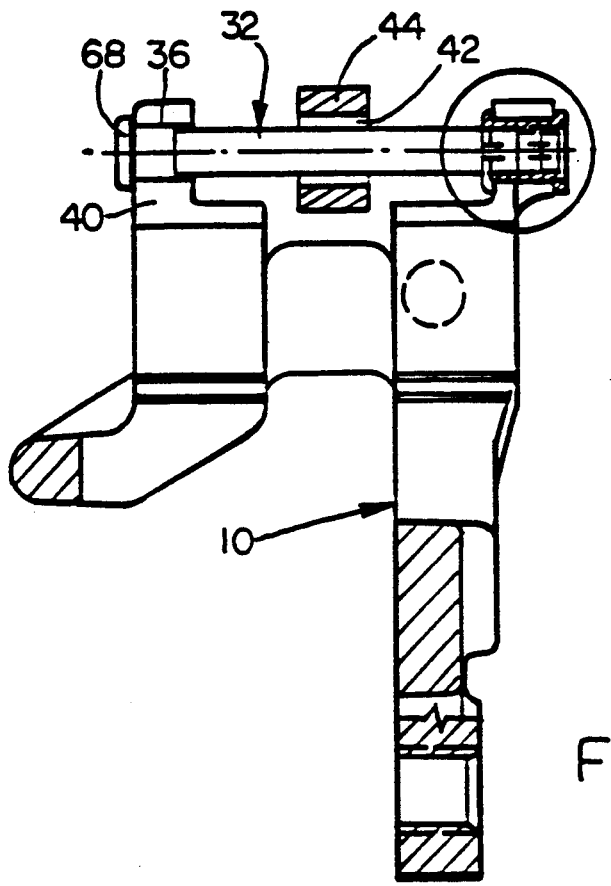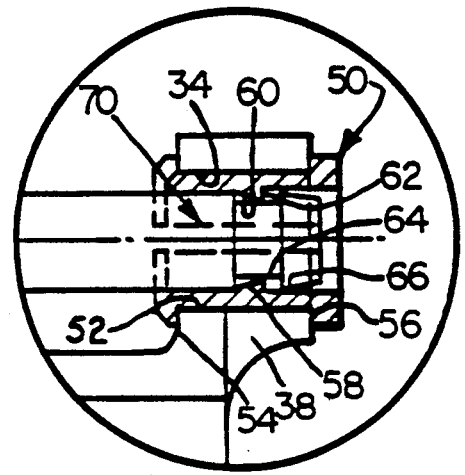
FIG.2A
FIG.2
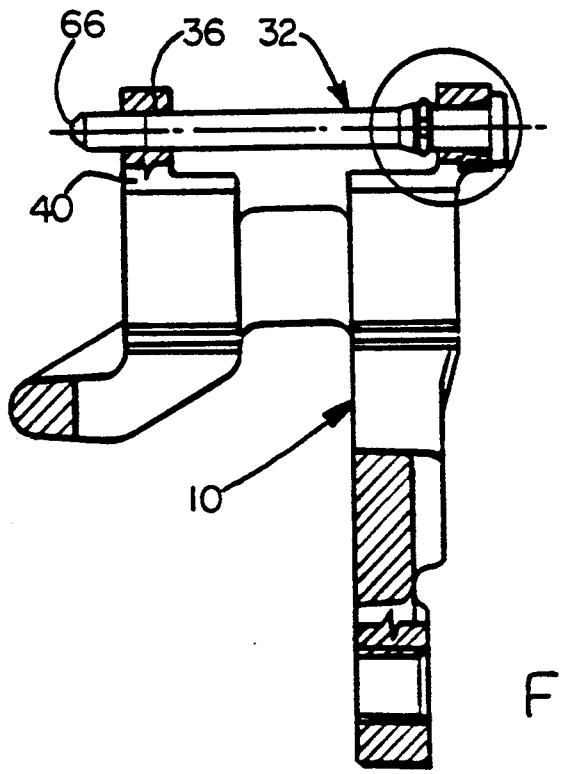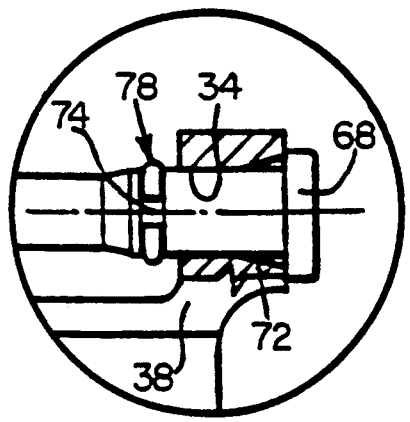
FIG.3A
FIG.3

DISK-BRAKE

The subject of the invention is a sliding-caliper disk-brake, especially for a motor vehicle.

The invention relates particularly to a disk-brake, the caliper of which is mounted slideably by means of an axial column on a stationary support, in which are received in an anchored and sliding manner two friction elements capable of coming into frictional engagement with the opposite faces of a rotating disk during the activation of a brake motor acting directly on one of the friction elements and acting on the other friction element as result of reaction by way of the sliding caliper.

In a known way, in this type of disk-brake, the caliper is generally maintained in position on the stationary support, during the assembly of the brake, either by means of a pin passing through perforations made in lugs fixed to the stationary support and through an aperture made in an extension of the caliper and held in place by retaining means, such as a key, or by means of a second axial column associated with the stationary support via a threaded connection and, as for example in EP-A-0,054,496, equipped with a locking sleeve held fixed to the caliper by means of a locking element, of which one portion passes through an orifice formed in the caliper, thereby locking the sleeve, and of which another U-shaped portion immobilizes the locking element relative to the caliper.

EP-A-0,036,368 has also made provision for locking the caliper to the stationary support by means of an elongate elastic element fastened to the stationary support or to the caliper by one of its ends and held elastically opposite a notched position formed in the caliper or in the stationary support and comprising a bearing face extending axially so as to prevent the locking element from escaping radially.

These various means for locking the caliper to the stationary support in terms of rotation about the column all have the major disadvantage of being of complex assembly. In fact, a disk-brake is always accommodated in the vicinity of the axle and stub of a vehicle wheel, this space by its very nature being restricted and of difficult access, and where the maneuvers necessary for mounting components of small size at exact locations are complicated and tedious. Moreover, the difficulty of access to these places obviously make it very difficult, and sometimes impossible, to carry out a visual check of the correct installation of the means for locking the caliper on the stationary support in terms of rotation, and this can be detrimental to the mounting safety of the disk-brake which is itself the main safety member of a motor vehicle.

The subject of the invention is a disk-brake of the above-described type, in which such a disadvantage is avoided.

With this in view, the invention provides a diskbrake having a caliper mounted slideably on a stationary support, comprising two friction elements received in an anchored and sliding manner in said stationary support and capable of coming into frictional engagement with the opposite faces of a rotating disk during the actuation of a brake motor, an axial column fixed to the stationary support and received in a sliding manner in a corresponding bore formed in the caliper, and a means for locking the caliper on the stationary support in terms of rotation about the column.

According to the invention, the means for locking the caliper to the stationary support comprises selflocking means.

Figure 4A:
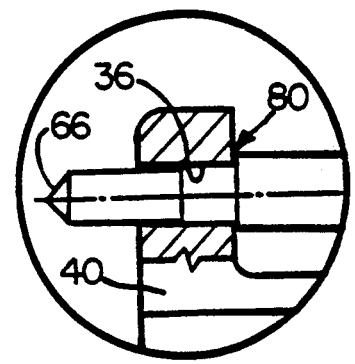
Figure 4:
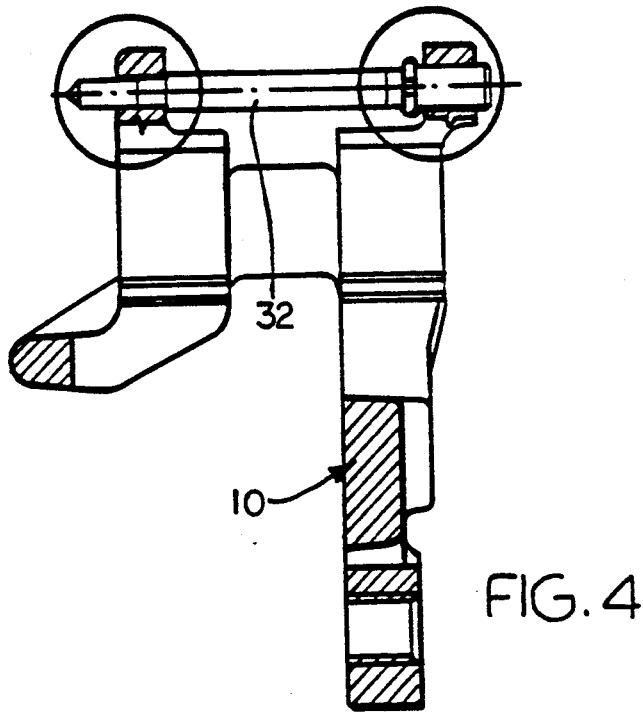
Figure 4B:
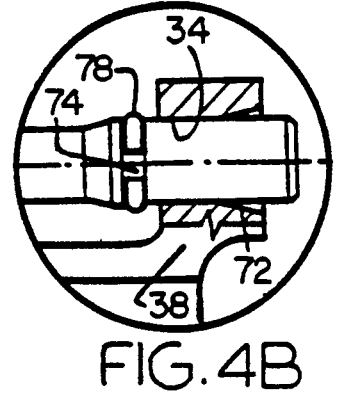
Figure 5A:
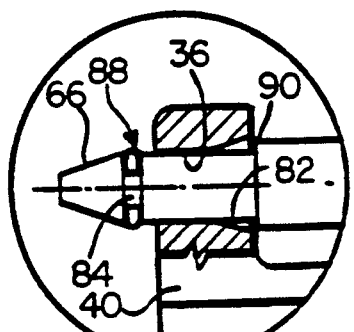
Figure 5:
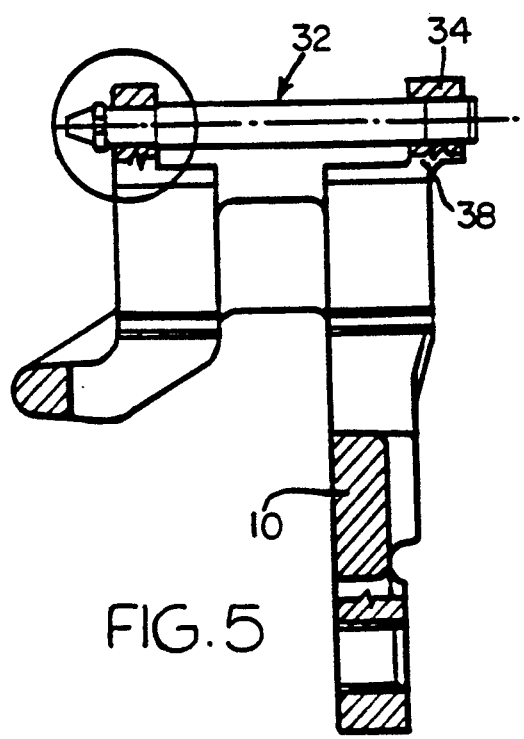

The invention will now be described by way of example with reference to the accompanying drawings in which:

FIG. 1 is a top view of a disk-brake produced according to the present invention, FIG. 2 is a sectional view along the line 2—2 of FIG. 1, showing in more detail a first embodiment of a locking means according to the invention, FIG. 2A is an enlarged view of the circled portion of FIG. 2, FIG. 3 is a view, similar to that of FIG. 2, of a second embodiment of the invention, FIG. 3A is an enlarged view of the circled portion of FIG. 3, FIGS. 4 and 5 illustrate alternative versions of the embodiment of FIG. 3, FIGS. 4A, 4B and 5A are enlarged views of the circled portions of FIGS. 4 and 5, respectively.

Referring first of all to FIG. 1, it can be seen that the disk-brake shown in the figure comprises a support 10 intended to be associated with a stationary part (not shown) of the vehicle. The stationary support 10 receives in a sliding manner a moveable caliper 12 straddling a disk 14 intended to be associated in terms of rotation with a wheel of the vehicle.

The disk-brake comprises, furthermore, two friction members 16 and 18 equipped respectively with support plates 20 and 22 and capable of coming into frictional engagement with the rotating disk 14 during the actuation of a hydraulic brake motor 24. The friction members 16 and 18 are received in an anchored and sliding manner in an aperture 26 formed in the stationary support 10.

The caliper 12 slides on the stationary support 10 by means of an axial column 28, the axis of which is substantially parallel to the axis of the disk 14. The column 28 is fixed to the stationary support 10 and is received in a sliding manner in a corresponding bore formed in one arm 12a of the caliper 12.

The disk-brake also comprises a means, designated as a whole by the reference 30, for locking the caliper 12 to the stationary support 10, which opposes the tilting of the caliper about the axis of the column 28, but which allows the caliper 12 to slide on the column 28 during the actuation of the hydraulic brake motor 24.

For this purpose, the locking means 30 consists of a spindle 32 of an axis parallel to that of the column 28 and passing through perforations 34 and 36 made in respective lugs 38 and 40 fixed to the stationary support 10 and through an aperture 42 made in an extension 44 of the caliper 12.

According to the invention, this spindle 32 comprises self-locking means which allow an easy mounting of the spindle on the stationary support and its retention in the axial direction in such a way that, once installed, it does not escape, this being achieved in a reliable manner. These self-locking means are shown in more detail in the following figures.

FIG. 2 shows an example of a first, embodiment of the invention. It can be seen in FIG. 2a that there has been arranged in one of the lugs of the stationary support 10, for example the lug 38, on the inside of the perforation 34, a plastic bush 50 capable of withstanding the high temperatures generated during an intensive use of the disk-brake thus equipped.

The outer wall of the bush 50 is formed with a groove 52 of the same axial length as the perforation 34, so that the edges 54 and 56 of this groove 52 ensure that the bush 50 is held in place in the perforation 34. The inner wall of the bush 50 is formed with a bulge 58 projecting towards the inside of the bush. This bulge 58 has a conical wall 60 and a wall 62 perpendicular to the axis of symmetry of the bush 50.

The spindle 32, of an outside diameter the same as the inside diameter of the bush 50 in its part where the bulge 58 is not formed, is shaped, in the vicinity of one of its ends, with a peripheral groove 64, the outside diameter of which is equal to the inside diameter of the bulge 58. The part 66 of the spindle 32 located between the groove 64 and its end is produced in conical form, the apex angle of which is advantageously equal to the apex angle of the conical wall 60 of the bulge 58. The other end of the spindle 32 is shaped with a widened head 68.

The process of installing the spindle 32 will easily have been understood from the foregoing explanations. When a maintenance operation on the brake is concluded, for example when the friction members 16, 18, 20, 22 have been replaced by new members and the disk-brake is ready to be put into operation again, it is sufficient to arrange a new bush 50 in the perforation 34 of the lug 38. This bush is introduced and positioned easily in the perforation 34 as result of the elasticity of the material of which it is made. Advantageously, this elasticity can be increased by making one or more longitudinal incisions 70 on part of the outer surface of the bush 50. Likewise advantageously, these incisions 70 are made in the groove 52 of the outer surface of the bush 50 and have the same length as the groove 52.

Once the stationary support has been thus equipped with a bush, the caliper 12 is pivoted about the column 28, until the aperture 42 in the extension 44 of the caliper is aligned with the perforations 34 and 36 of the lugs 38 and 40 of the stationary support 10. In the chosen example, the spindle 32 can then be introduced into the perforation 36. After going beyond the extension 44, the end of the spindle 32 penetrates into the bush 50.

This penetration is made easier by the conical shape of the end part 66 of the spindle. As it continues its movement, this conical part 66 encounters the conical wall 60 of the bulge 58, which it pushes outwards as a result of the elasticity of the material of the bush, advantageously increased by the presence of the incisions 70. When the conical part 66 of the spindle has gone beyond the wall 62 of the bead 58, the latter then penetrates into the groove 64 of the spindle 32, the wall 62 of the bead 58 thus preventing any movement of the spindle 32 in the opposite direction. The latter is therefore immobilized in its active position solely as a result of its introduction into the bush 50. The prevention of any axial movement of the spindle 32 is absolute if, advantageously, the head 68 of the spindle comes into contact with the lug 40, during the installation of the spindle, immediately after the bead 58 has penetrated into the groove 64 at the other end of the spindle.

It can therefore be seen clearly that there has been provided, according to the invention, a means for locking the caliper in terms of rotation about the column, which is especially simple to use because it requires no additional maneuver to block it in terms of axial translational movement, since it comprises the self-locking means just described. This locking spindle is therefore especially simple to install, since it is sufficient to introduce it easily, as a result of the conical shape of its end, solely by means of an axial translational movement, until it comes into abutment, for example with its head, against the stationary support, in which position it will be blocked automatically against any subsequent translational movement in one direction or the other.

Such a locking means is also especially economical, since the machining at the end of the spindle and the molding of the plastic bush are operations involving very little outlay in comparison with the known blocking solutions with springs, pins, keys, etc. This also makes it possible to provide for the replacement of the plastic bush during every maintenance operation on the brake.

Various alternative versions of this embodiment are, of course, possible. There can, for example, be provision for ensuring that the limit stop is obtained by means of a shoulder formed on the spindle and interacting with the face of the bush by way of which the conical end of the spindle has penetrated. Naturally, too, the function of the lug 38 of the stationary support is not decisive, and the lug 40 can be equipped with the bush 50, in which case the installation of the spindle 32 takes place via the perforation 34 of the lug 38.

FIG. 3 illustrates another embodiment of the invention, in which the self-locking means of the spindle 32 are formed by means of an elastic ring instead of a plastic bush, as before.

It can be seen from FIGS. 3 and 3a that the perforation 34 in the lug 38 is produced with a conical widening 72 in its end part facing towards the outside of the stationary support 10. On the other hand, the spindle 32 is shaped, in the vicinity of its head 68, with an annular peripheral groove 74 in which an elastic ring 78 is arranged.

The functioning of the self-locking means of this embodiment will have been understood immediately. As before, when the disk-brake is ready to be put into operation again, the spindle 32 equipped with the ring 78 is introduced by its end 66 into the perforation 34 until said end reaches the perforation 36. During this movement the groove 74 reaches the entrance of the perforation 34 together with the ring which said groove contains. Said ring then encounters the conical surface 72 which compresses it to the point where it is inserted completely into the space contained between the groove 74 and the perforation 34. It remains in this state until the groove 74 has gone completely beyond the perforation 34. It then resumes its state of rest, at the same time increasing its diameter, thus making it impossible to retract the spindle 32.

As before, it is advantageous to provide a stop surface on the spindle 32 to prevent it from moving in both directions. It can be seen from FIGS. 3 and 3a that this stop surface is formed by the head 68 of the spindle 32. It will therefore be expedient to ensure that the distance between the head 68 and the groove 74 is slightly larger than the depth of the perforation 34, that is to say than the thickness of the lug 38. It can be seen from FIGS. 4 and 4a that this stop surface consists of a shoulder 80 formed near the end 66 of the spindle 32. It will thus be expedient, in this case, if the distance between the shoulder 80 and the groove 74 is slightly smaller than the distance between the lugs 38 and 40. It can also be seen from FIGS. 4 and 4b that it is then no longer necessary for the spindle 32 to have a head 68. It can possess one, however, for example in order to make it easier to install it.

FIGS. 5 and 5a illustrate another version of the embodiment shown in FIGS. 3 or 4, in which the self-locking means are located towards the end 66 of the spindle 32. It can be seen from FIGS. 5 and 5a that the perforation 36 in the lug 40 is produced with a conical widening 82 in its end part facing the inside of the stationary support 10. The spindle 32 is shaped, in the vicinity of its end 66, with an annular peripheral groove 84 in which an elastic ring 88 is arranged.

It will have been understood that the surfaces 82 and 72, the grooves 84 and 74 and the rings 88 and 78 are identical and have the same function. They will therefore not be described in any more detail. When the introduction of the spindle 32 has been carried out by way of the perforation 34, the self-locking means shift aside, when the end 66 of the spindle penetrates into the perforation 36, and prevent the retraction of the spindle as soon as the groove 84 has come out of the lug 40. To avoid giving the spindle 32 excessive length, the groove 84 will advantageously be formed adjacent to the conical end part 66, as shown. The stop preventing the movement of the spindle 32 in the other direction can be produced by a shoulder 90 formed on the spindle 32 on the other side of the lug 40, as shown, or by the head 68 of the spindle 32 interacting with the lug 38.

As before, provision can be made for replacing the elastic ring 78 or 88 during each maintenance operation on the brake.

We claim:

1. A disc brake having a caliper mounted slidably on a stationary support, comprising two friction elements received in anchored and sliding manner in said stationary support and capable of coming into frictional engagement with opposite faces of a rotating disc during actuation of a brake motor of the disc brake, only a single axial column fixed to the stationary support and received in a corresponding bore formed in the caliper to provide primary slidable support for said caliper relative to the stationary support, and a spindle passing both through perforations in the stationary support and an aperture in the caliper for locking the caliper to the stationary support in terms of rotation about the column, the stationary support and spindle comprising self-locking means comprising a part elastically deformable in a radial direction relative to the spindle and engageable with a radial surface located at one of the spindle and the stationary support and an associated perforation of said perforations through which extends said spindle, and shoulder means of the spindle which is also engageable with another radial surface located at the stationary support and adjacent a perforation of said perforations, to allow only a limited axial translational movement of the spindle after installation of the spindle on the disc brake.

2. The disc brake according to claim 1, wherein the part elastically deformable in the radial direction comprises a radially inward extension formed on an inner wall of a passage in a bush located in a perforation, located in a lug of the stationary support, of said perforations.

3. The disc brake according to claim 2, wherein the extension of the bush interacts with a peripheral groove formed on the spindle.

4. The disc brake according to claim 1, wherein the part elastically deformable in the radial direction comprises an elastic ring arranged in a peripheral groove formed on the spindle.

5. The disc brake according to claim 4, wherein during installation of the spindle the elastic ring interacts with a conical surface located in a perforation, located in a lug of the stationary support, of said perforations.

* * * * *